US012055872B2

(12) United States Patent
Adams et al.

(10) Patent No.: US 12,055,872 B2
(45) Date of Patent: Aug. 6, 2024

(54) TONER CONTAINER HANDLE

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Patrick Lawrence Ransom, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 17/961,093

(22) Filed: Oct. 6, 2022

(65) Prior Publication Data

US 2024/0094657 A1 Mar. 21, 2024

Related U.S. Application Data

(60) Provisional application No. 63/406,831, filed on Sep. 15, 2022.

(51) Int. Cl.
*G03G 15/08* (2006.01)
*G03G 21/18* (2006.01)

(52) U.S. Cl.
CPC ..... *G03G 15/0875* (2013.01); *G03G 21/1842* (2013.01); *G03G 21/1846* (2013.01); *G03G 2215/068* (2013.01); *G03G 2221/1846* (2013.01)

(58) Field of Classification Search
CPC ........... G03G 15/0875; G03G 21/1846; G03G 2221/1846; G03G 21/1853; G03G 21/1839; G03G 21/1842; G03G 2215/068
USPC ........................................................ D18/43
See application file for complete search history.

(56) References Cited

U.S. PATENT DOCUMENTS

| | | | |
|---|---|---|---|
| 7,321,739 | B1 | 1/2008 | Dawson et al. |
| 8,718,511 | B2 | 5/2014 | Hale et al. |
| 8,761,639 | B1 | 6/2014 | Leemhuis et al. |
| 8,948,660 | B2 | 2/2015 | Baker et al. |
| 9,261,851 | B2 | 2/2016 | Leemhuis et al. |
| 9,285,758 | B1 | 3/2016 | Boettcher et al. |

(Continued)

OTHER PUBLICATIONS

International Search Report and Written Opinion of the International Searching Authority dated Nov. 16, 2023 for PCT Application No. PCT/US2023/031291.

(Continued)

*Primary Examiner* — Arlene Heredia
*Assistant Examiner* — Laura Roth
(74) *Attorney, Agent, or Firm* — Justin M. Tromp

(57) ABSTRACT

A toner container according to one example embodiment includes a pivotable handle. The handle includes a front segment extending along a front of a body of the toner container when the handle is in a first position for contacting a corresponding pry surface in an image forming device when the handle moves from the first position to a second position. The handle includes a rear segment extending along a rear of the body when the handle is in the first position permitting a user to actuate the rear segment to move the handle from the first position to the second position. The handle includes a first side segment extending along the first side of the body and a second side segment extending along the second side of the body. The first and second side segments connect the front segment and the rear segment.

30 Claims, 14 Drawing Sheets

(56) References Cited

U.S. PATENT DOCUMENTS

| | | | | |
|---|---|---|---|---|
| 9,317,004 | B1 | 4/2016 | Boettcher et al. | |
| 11,347,180 | B2 | 5/2022 | Cavill et al. | |
| 2006/0045567 | A1* | 3/2006 | Ahn .................. | G03G 15/0896 399/111 |
| 2010/0067947 | A1* | 3/2010 | Yuzawa ............... | G03G 15/087 399/119 |
| 2011/0020014 | A1* | 1/2011 | Okamoto ........... | G03G 15/0855 399/258 |
| 2017/0102670 | A1 | 4/2017 | Tosh et al. | |

OTHER PUBLICATIONS

U.S. Appl. No. 29/853,380, filed Sep. 15, 2022 (Adams et al.).
U.S. Appl. No. 29/853,383, filed Sep. 15, 2022 (Adams et al.).
U.S. Appl. No. 29/853,384, filed Sep. 15, 2022 (Adams et al.).
U.S. Appl. No. 29/853,386, filed Sep. 15, 2022 (Adams et al.).
U.S. Appl. No. 29/853,388, filed Sep. 15, 2022 (Adams et al.).
U.S. Appl. No. 29/853,379, filed Sep. 15, 2022 (Adams et al.).

* cited by examiner

TONER CONTAINER HANDLE

CROSS REFERENCES TO RELATED APPLICATIONS

This application claims priority to U.S. Provisional Patent Application Ser. No. 63/406,831, filed Sep. 15, 2022, entitled "Toner Container Handle," the content of which is hereby incorporated by reference in its entirety.

BACKGROUND

1. Field of the Disclosure

The present disclosure relates generally to image forming devices and more particularly to a toner container handle.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units that have a shorter lifespan than the image forming device. The replaceable units require periodic replacement by the user in order to continue printing. The user experience associated with replacing the replaceable unit is an important design consideration. Preferably, the process of removing an existing replaceable unit and installing a replacement is intuitive, efficient and relatively simple. From the manufacturer's perspective, it is desired to reduce the cost and complexity of the replaceable unit and overall system design. It is also desired to minimize the overall size of the replaceable unit and the image forming device, consistent with consumer preferences for smaller devices and components.

SUMMARY

A toner container for use in an image forming device according to one example embodiment includes a body having a top, a bottom, a front and a rear positioned between a first side and a second side of the body. The body has a reservoir for holding toner. A downward facing outlet port is positioned on the front of the body for exiting toner from the toner container. A handle is pivotable relative to the body about a pivot axis between a first position and a second position. The handle includes a front segment extending along the front of the body when the handle is in the first position for contacting a corresponding pry surface in the image forming device when the handle moves from the first position to the second position for lifting the toner container from a corresponding toner container receptacle in the image forming device when the toner container is installed in the image forming device. The handle includes a rear segment extending along the rear of the body when the handle is in the first position permitting a user to actuate the rear segment to move the handle from the first position to the second position for removing the toner container from the corresponding toner container receptacle in the image forming device when the toner container is installed in the image forming device. The handle includes a first side segment extending along the first side of the body and a second side segment extending along the second side of the body. The first and second side segments connect the front segment and the rear segment.

Embodiments include those wherein the front segment, the rear segment and the first and second side segments of the handle are positioned no higher than the top of the body when the handle is in the first position.

In some embodiments, the front segment extends horizontally along the front of the body when the handle is in the first position.

Embodiments include those wherein a bottom contact surface of the front segment positioned to contact the corresponding pry surface in the image forming device when the handle moves from the first position to the second position is positioned higher than the pivot axis when the handle is in the first position and lower than the pivot axis when the handle is in the second position.

In some embodiments, the rear segment extends horizontally along the rear of the body when the handle is in the first position.

Embodiments include those wherein the rear segment is positioned lower than the pivot axis when the handle is in the first position and higher than the pivot axis when the handle is in the second position.

In some embodiments, the first and second side segments each include a front portion that is proximate to the front of the body and that extends downward and rearward when the handle is in the first position. In some embodiments, the pivot axis extends through the front portions of the first and second side segments.

Embodiments include those wherein the first and second side segments each include a rear portion that extends horizontally when the handle is in the first position.

Some embodiments include a notch in the front of the body below the front segment of the handle when the handle is in the first position providing clearance for the corresponding pry surface in the image forming device during removal of the toner container from the corresponding toner container receptacle in the image forming device. In some embodiments, the notch in the front of the body includes a tapered bottom surface that tapers upward in a direction from the front of the body toward the rear of the body. In some embodiments, the notch in the front of the body includes first and second tapered side surfaces that taper inward toward each other in the direction from the front of the body toward the rear of the body. In some embodiments, the notch in the front of the body includes a first notch positioned proximate to the first side of the body and a second notch positioned proximate to the second side of the body, and a vertical position of the first notch may be aligned with a vertical position of the second notch.

Some embodiments include a notch in the rear of the body providing clearance for a user's hand permitting a user to manually actuate the rear segment to move the handle from the first position to the second position.

A toner container for use in an image forming device according to another example embodiment includes a body having a top, a bottom, a front and a rear positioned between a first side and a second side of the body. The body has a reservoir for holding toner. A downward facing outlet port is positioned on the front of the body for exiting toner from the toner container. A handle is pivotable relative to the body about a pivot axis between a first position and a second position. The handle includes a front segment extending along the front of the body when the handle is in the first position for contacting a corresponding pry surface in the image forming device when the handle moves from the first position to the second position for lifting the toner container from a corresponding toner container receptacle in the image forming device when the toner container is installed in the image forming device. The handle includes a rear segment extending along the rear of the body when the handle is in the first position permitting a user to lift the rear segment upward to move the handle from the first position to the second position causing the front segment to move downward to exert a downward force on the corresponding pry surface for removing the toner container from the corresponding toner container receptacle in the image forming device when the toner container is installed in the image forming device. The handle is positioned no higher than the top of the housing when the handle is in the first position.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
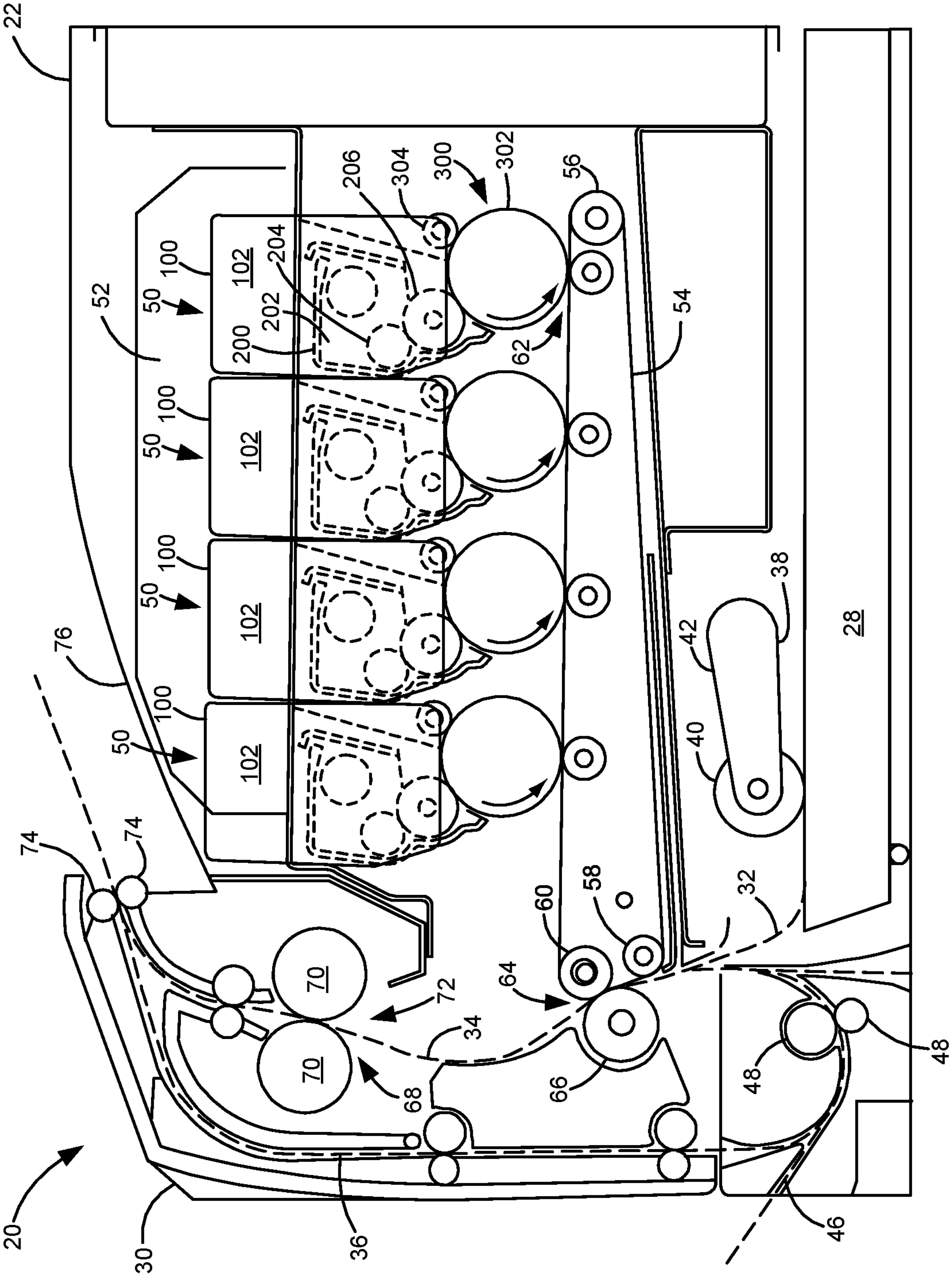
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper or any other desired substrate. Trays 28 are preferably removable for refilling. A control panel 30 may be located on housing 22. Using control panel 30, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll 40 positioned at the end of a pivotable arm 42. Roll 40 rotates to move the media sheet from tray 28 and into media path 32. The media sheet is then moved along media path 32 by various transport rollers. Media sheets may also be introduced into media path 32 by a manual feed 46 having one or more rolls 48.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200 and PC unit 300 are labeled on only one of the imaging stations 50. In the example embodiment illustrated, each imaging station 50 is substantially the same except for the color or type of toner.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image, Developer roll 206 then transfers toner to PC drum 302 to form a toner image. A metering device, such as a doctor blade, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a clockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along simplex path 34 and into a fuser area 68. Fuser area 68 includes fusing rolls or belts 70 that form a nip 72 to adhere the toner image to the media sheet. The fused media sheet then passes through exit rolls 74 located downstream from fuser area 68. Exit rolls 74 may be rotated in either forward or reverse directions. In a forward direction, exit rolls 74 move the media sheet from simplex path 34 to an output area 76 of image forming device 20. In a reverse direction, exit rolls 74 move the media sheet into duplex path 36 for image formation on a second side of the media sheet.

Figure 2:
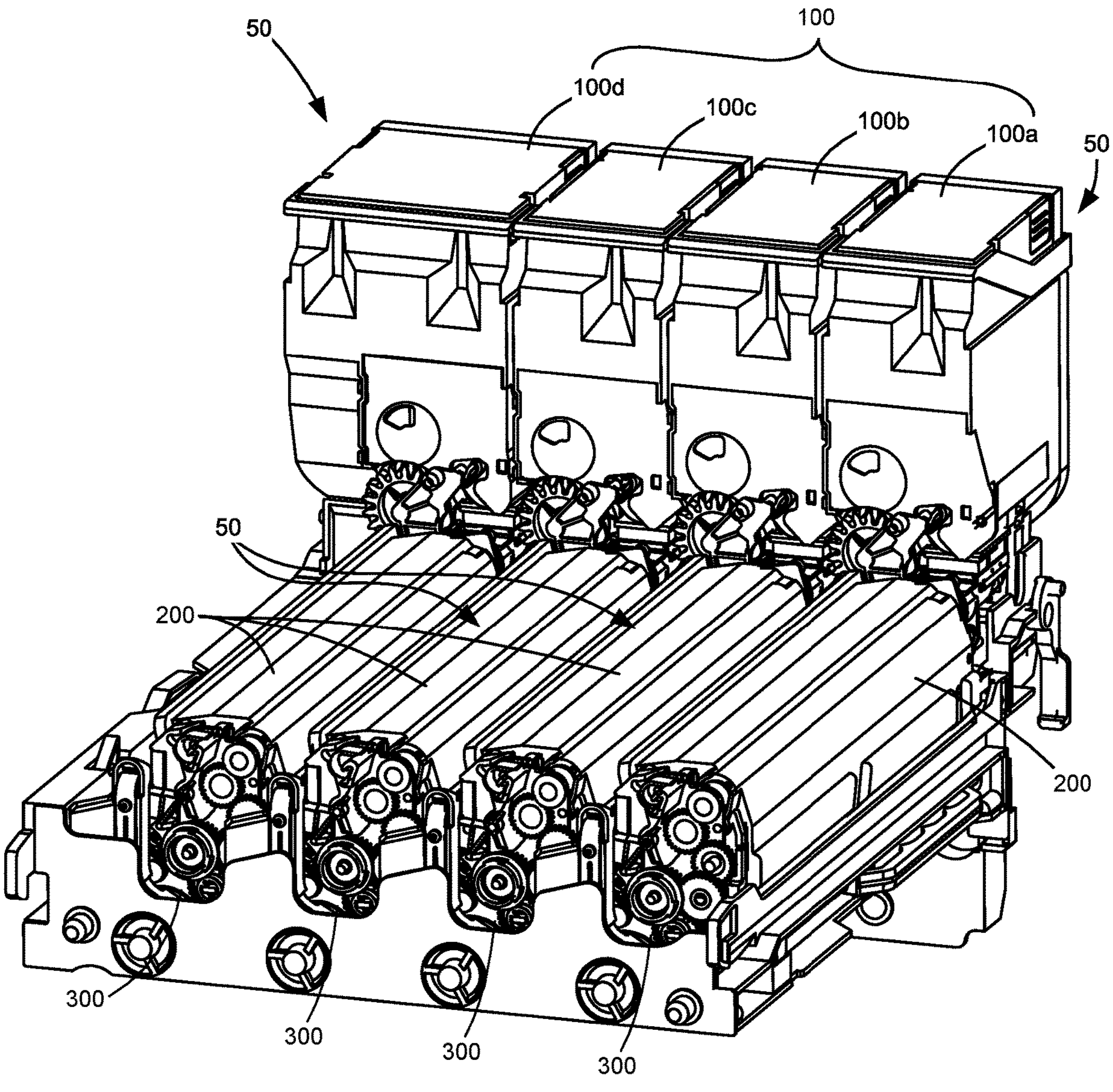
FIG. 2 is a perspective view of four imaging stations each having a toner cartridge and a developer unit for use with the image forming device according to one example embodiment.

A monocolor image forming device 20 may include a single imaging station 50, as compared to a color image forming device 20 that may include multiple imaging stations 50. FIG. 2 illustrates a set of four imaging stations 50 that each includes a respective toner cartridge 100, developer unit 200 and PC unit 300. In the example embodiment illustrated, image forming device 20 includes three toner cartridges 100*a*, 100*b*, 100*c* having substantially the same construction and size and a toner cartridge 100*d* having a larger overall size and toner capacity. In this embodiment, toner cartridges 100*a*, 100*b*, 100*c* each contain colored toner, such as, for example, cyan, yellow and magenta toner, respectively, and toner cartridge 100*d* contains black toner. In some embodiments, image forming device 20 may also permit installation of a toner cartridge having substantially the same construction and size as toner cartridges 100*a*, 100*b*, 100*c* in place of the larger toner cartridge 100*d* such that image forming device 20 may permit the use of either a smaller (normal capacity) black toner cartridge or a larger capacity black toner cartridge, depending on the user's selection.

Figure 3:
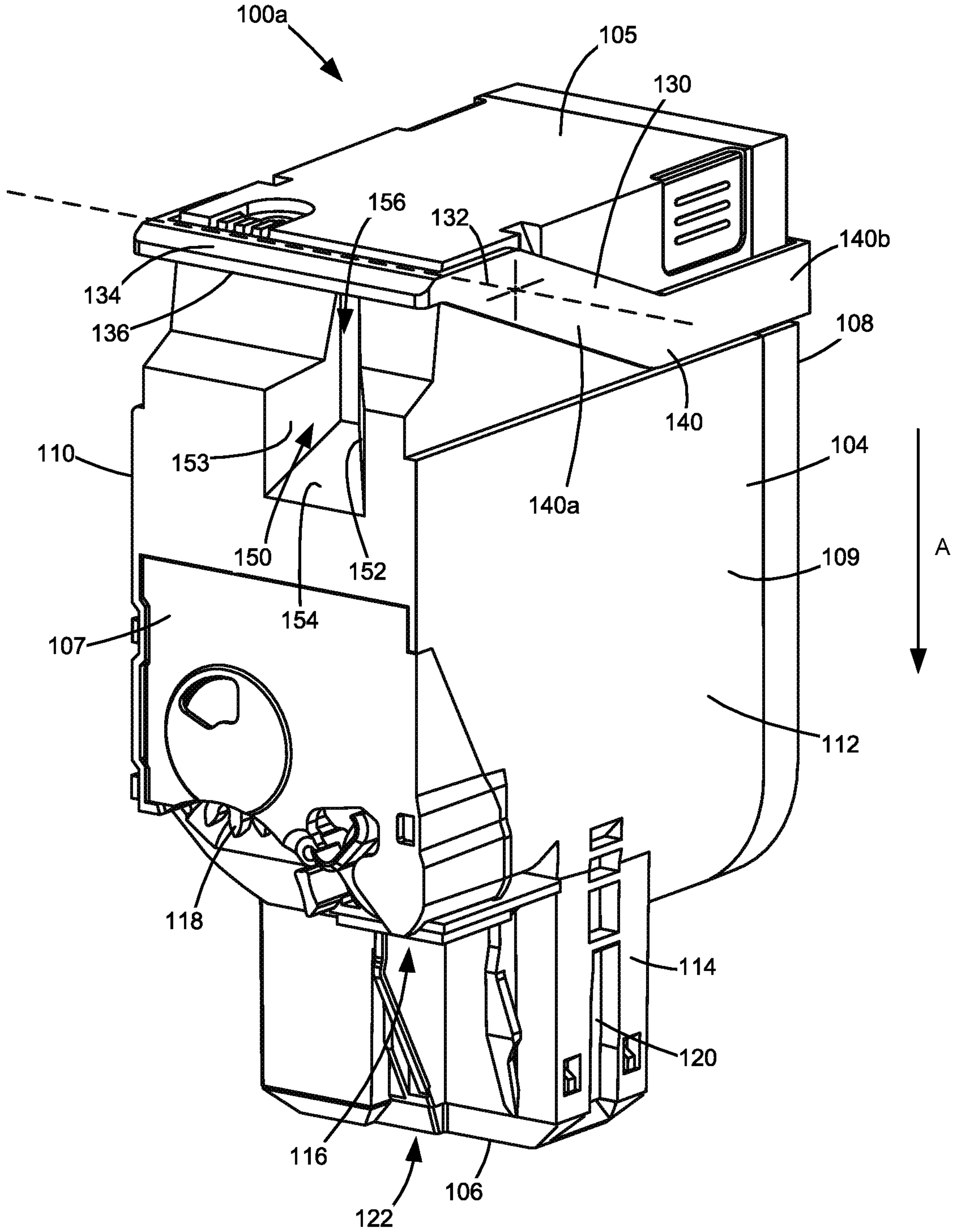
FIGS. 3 and 4 are perspective views of a first toner cartridge according to one example embodiment.
Figure 4:
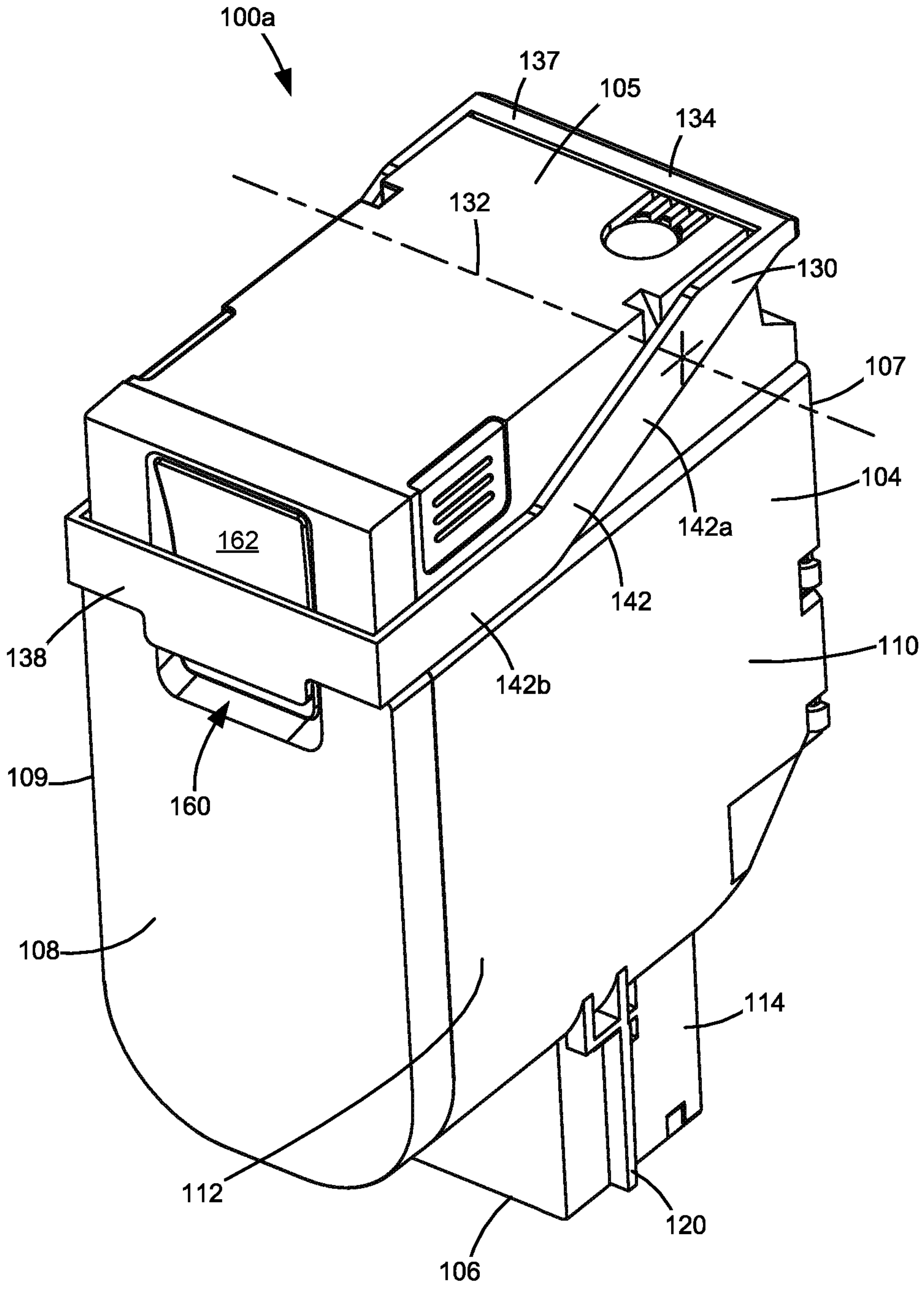

FIGS. 3 and 4 show toner cartridge 100*a*, which may have substantially the same construction as toner cartridges 100*b* and 100*c* and, optionally, toner cartridge 100*d*, according to one example embodiment. Toner cartridge 100*a* includes a body 104 housing toner reservoir 102 therein. Body 104 includes a top 105, a bottom 106, a front 107, a rear 108 and a pair of sides 109, 110. In the example embodiment illustrated, body 104 includes a main section 112 and an extension section 114, Extension section 114 is positioned at the bottom 106 of body 104. As illustrated in FIGS. 3 and 4, in one example embodiment, a depth of extension section 114 is less than a depth of main section 112, and a height of extension section 114 is less than a height of main section 112.

Toner cartridge 100*a* includes an outlet port 116 for transferring toner to an inlet port of the corresponding developer unit 200. In the example embodiment illustrated, outlet port 116 is formed as a downward facing opening on main section 112 on front 107 of body 104, roughly midway up the front 107 of body 104. Outlet port 116 may include a shutter that regulates whether toner is permitted to flow from toner reservoir 102 out of outlet port 116.

Toner cartridge 100*a* further includes a drive gear 118 that meshes with and receives rotational power from a corresponding gear in image forming device 20, e.g., on the corresponding developer unit 200, when toner cartridge 100*a* is installed in image forming device 20 in order to provide rotational power to various toner agitators positioned within reservoir 102 for moving toner to outlet port 116. In the example embodiment illustrated, drive gear 118 is positioned on the front 107 of body 104, and a bottom portion of drive gear 118 mates with the corresponding gear in image forming device 20 when toner cartridge 100*a* is installed in image forming device 20.

Toner cartridge 100*a* may also include various alignment members 120 that align toner cartridge 100*a* with the corresponding developer unit 200 during insertion of toner cartridge 100*a* in the direction shown by arrow A in FIG. 3. For example, alignment members 120 may include a combination of projections that project outward from sides 109, 110 of body 104 and/or elongated slots formed as depressions in sides 109, 110 that mate with corresponding slots and/or projections, respectively, to ensure accurate positioning of toner cartridge 100*a*. For example, alignment members 120 help ensure that outlet port 116 mates with the inlet port of developer unit 200 and that drive gear 118 mates with the corresponding drive gear in image forming device 20.

Toner cartridge 100*a* may also include an electrical connector 122 having electrical contacts that are ratable with corresponding electrical contacts in image forming device 20 when toner cartridge 100*a* is installed in image forming device 20 for facilitating a communication link between processing circuitry of toner cartridge 100*a* and a controller of image forming device 20. The processing circuitry of toner cartridge 100*a* may provide authentication functions, safety and operational interlocks, operating parameters and/or usage information related to toner cartridge 100*a* and may include hardware and/or software logic as desired. Electrical connector 122, including the electrical contacts, may be positioned in a recess or cavity formed in the bottom 106 of body 104. An opening at a bottom end of the cavity and a bottommost portion of body 104 permits a corresponding electrical connector in image forming device 20 to enter the cavity during downward insertion of toner cartridge 100*a* into image forming device 20.

With reference to FIGS. 3, 4, 5A and 5B, toner cartridge 100*a* includes a handle 130 for assisting a user with removing toner cartridge 100*a* from image forming device 20. Handle 130 is pivotable relative to body 104 about a pivot axis 132 between a first position shown in FIGS. 3, 4 and 5A and a second position shown in FIG. 5B. In the example embodiment illustrated, pivot axis 132 is horizontal and extends from side 109 to side 110, generally parallel to front 107 and rear 108 of body 104. Pivot axis 132 is positioned near top 105 of body 104 (for example, spaced slightly below top 105 of body 104). In the embodiment illustrated, pivot axis 132 is positioned closer to front 107 of body 104 than to rear 108 of body 104. In the example embodiment illustrated, handle 130 tends to fall due to gravity from the second position shown in FIG. 5B and settle at the first position shown in FIG. 5A. In other embodiments, handle 130 may be biased, for example, by a spring or other resilient biasing member, toward the first position, as desired.

Handle 130 includes a front segment 134 that extends along front 107 of body 104. In the example embodiment illustrated, front segment 134 extends horizontally along front 107 of body 104. Front segment 134 includes a bottom contact surface 136 that contacts a corresponding pry surface in image forming device 20 when handle 130 is manually moved by a user from the first position to the second position in order to remove toner cartridge 100*a* from image forming device 20 as discussed in greater detail below. In the example embodiment illustrated, front segment 134 including bottom contact surface 136 is positioned higher than pivot axis 132 when handle 130 is in the first position shown in FIG. 5A and lower than pivot axis 132 when handle 130 is in the second position shown in FIG. 5B. In this embodiment, a top surface 137 of front segment 134 is positioned no higher than top 105 of body 104 in the first and second positions of handle 130.

Handle 130 also includes a rear segment 138 that extends along rear 108 of body 104. In the example embodiment illustrated, rear segment 138 extends horizontally along rear 108 of body 104. Rear segment 138 provides a contact point for a user's hand or finger to allow the user to actuate handle 130 and move handle 130 from the first position to the second position in order to remove toner cartridge 100*a* from image forming device 20 as discussed in greater detail below. In the example embodiment illustrated, rear segment 138 is positioned lower than pivot axis 132 when handle 130 is in the first position shown in FIG. 5A and higher than pivot axis 132 when handle 130 is in the second position shown in FIG. 5B. In this embodiment, rear segment 138 is positioned lower than top 105 of body 104 in the first position of handle 130, and rear segment 138 extends higher than top 105 of body 104 in the second position of handle 130.

In the example embodiment illustrated, handle 130 includes a pair of side segments 140, 142 that extend along respective sides 109, 110 of body 104 and connect front segment 134 to rear segment 138. In the example embodiment illustrated, each side segment 140, 142 includes a respective front portion 140*a*, 142*a* proximate to front 107 of body 104 that extends downward and rearward along the respective sides 109, 110 of body 104 when handle 130 is in the first position and a respective rear portion 140*b*, 142*b* proximate to rear 108 of body 104 that extends horizontally along the respective sides 109, 110 of body 104 when handle 130 is in the first position. In the example embodiment illustrated, pivot axis 132 extends through front portions 140*a*, 142*a* of side segments 140, 142.

Handle 130 may be pivotably mounted to body 104 by any suitable means. For example, in one embodiment, a post on an inner surface of each side segment 140, 142 of handle 130 is received by a corresponding mount on each side 109, 110 of body 104 with the engagement between the posts and corresponding mounts defining pivot axis 132 of handle 130.

Figure 5A:
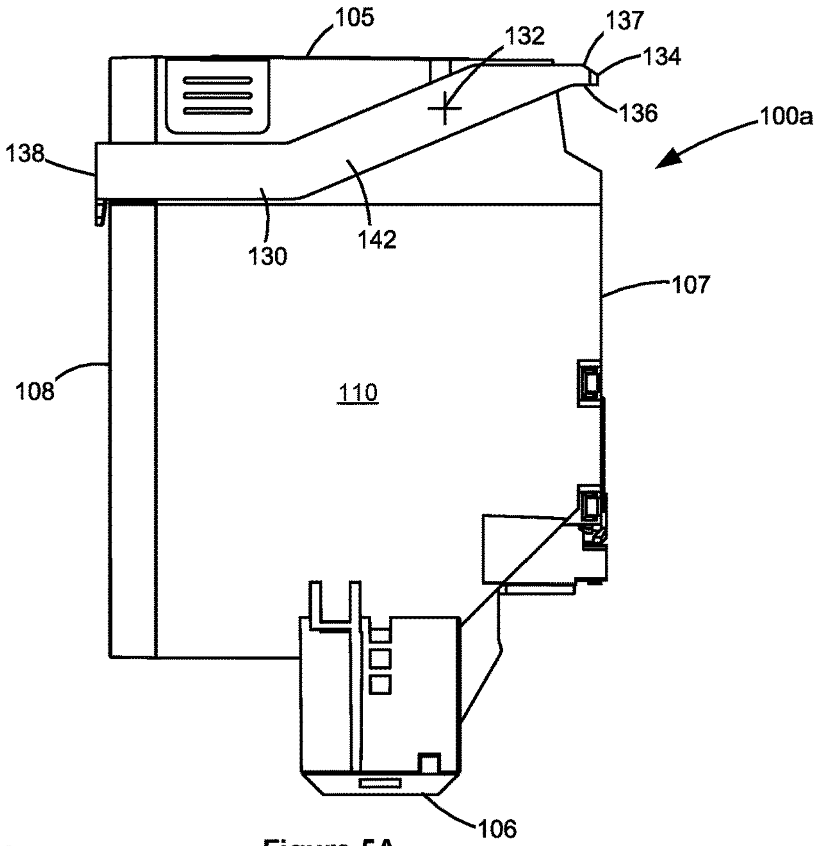
FIG. 5A is a side elevation view of the toner cartridge shown in FIGS. 3 and 4 showing a handle of the toner cartridge in a first position.
Figure 5B:
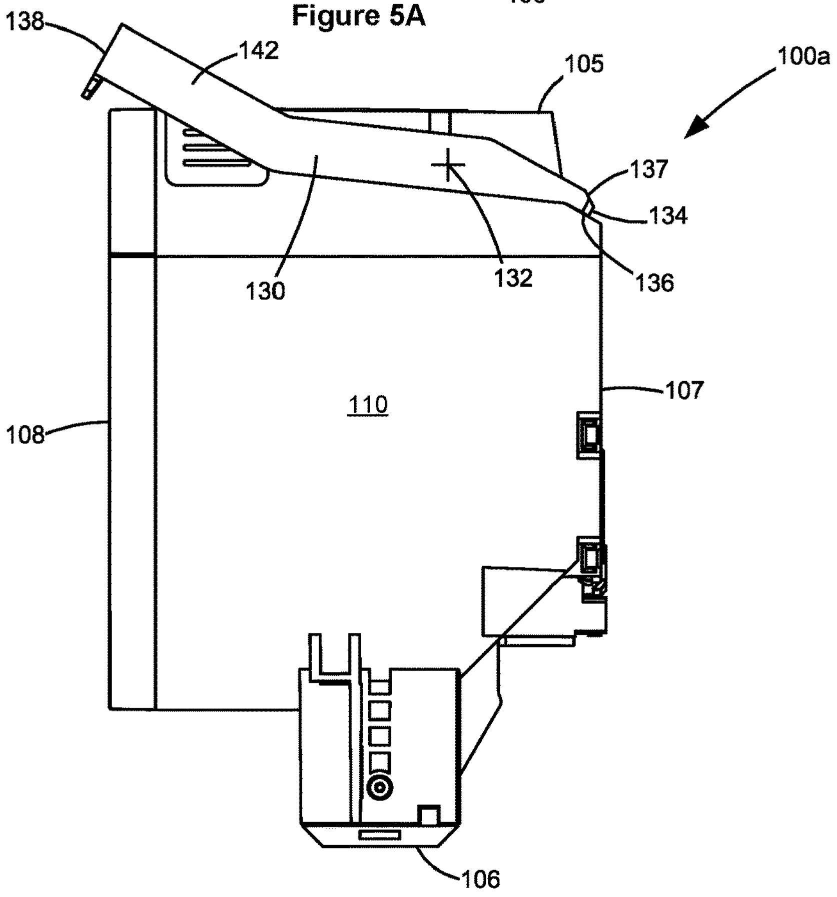
FIG. 5B is a side elevation view of the toner cartridge shown in FIGS. 3 and 4 showing the handle of the toner cartridge in a second position.
Figure 6:
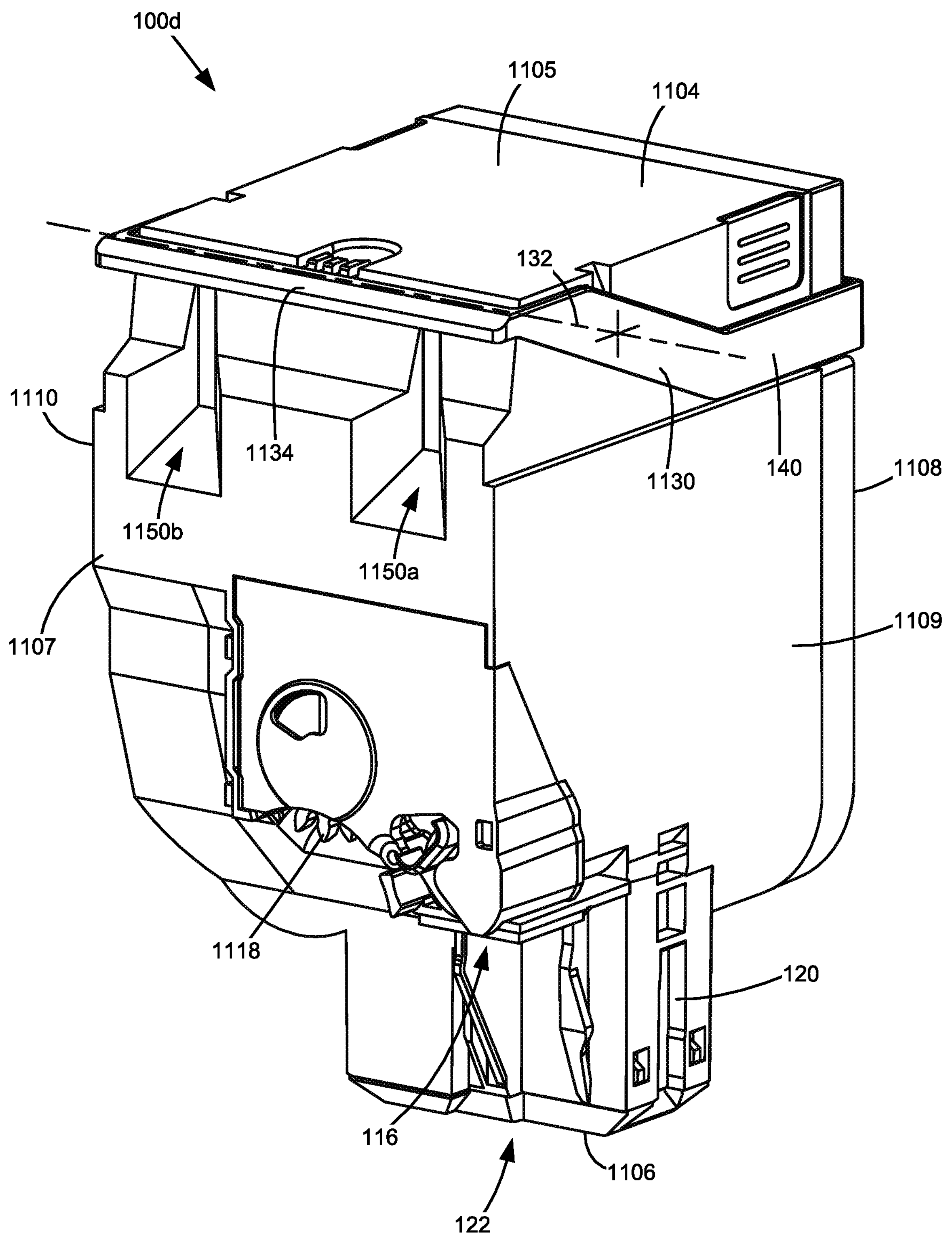
FIGS. 6 and 7 are perspective views of a second toner cartridge according to one example embodiment.

With reference to FIGS. 5A and 5B, in order to actuate handle 130 and move handle 130 from the first position shown in FIG. 5A to the second position shown in FIG. 5B, a user typically contacts rear segment 138 of handle 130 (for example, a bottom surface of rear segment 138) and lifts rear segment 138 upward. When handle 130 moves from the first position to the second position, handle 130 pivots clockwise as viewed in FIGS. 5A and 5B about pivot axis 132. When handle 130 moves from the first position to the second position, rear segment 138 raises from a position below pivot axis 132 and top 105 of body 104 to a position above pivot axis 132 and top 105 of body 104, and front segment 134 lowers from a position above pivot axis 132 to a position below pivot axis 132. When handle 130 returns from the second position to the first position, for example, as a result of gravity when a user releases handle 130, handle 130 pivots counterclockwise as viewed in FIGS. 5A and 5B about pivot axis 132.

With reference back to FIG. 3, in the example embodiment illustrated, toner cartridge 100*a* includes a notch or cutout 150 in front 107 of body 104 that provides clearance for a corresponding pry surface in image forming device 20 in order to accommodate the pry surface during removal of toner cartridge 100*a* from image forming device 20 as discussed in greater detail below. Cutout 150 is positioned below contact surface 136 of front segment 134 of handle 130 when handle 130 is in the first position. In the example embodiment illustrated, cutout 150 is formed by tapered side surfaces 152, 153, a tapered bottom surface 154 and an open top end 156. Side surfaces 152, 153 taper inward toward each other in a direction from front 107 to rear 108, and bottom surface 154 tapers upward in a direction from front 107 to rear 108.

With reference to FIG. 4, in the example embodiment illustrated, toner cartridge 100*a* includes a notch or cutout 160 in rear 108 of body 104 that provides clearance for a user's hand. As discussed in greater detail below, cutout 160 makes it easier for a user to engage or grasp rear segment 138 of handle 130 when handle 130 is in the first position in order to actuate in handle 130 and move handle 130 from the first position to the second position. In the example embodiment illustrated, cutout 160 includes an inset, tapered rear surface 162 that extends further toward front 107 of body 104 as surface 162 extends downward such that a depth of cutout 160 along a direction from rear 108 to front 107 increases in a downward direction.

FIGS. 6, 7, 8A and 8B show toner cartridge 100*d*, which has a larger overall size and toner capacity than toner cartridge 100*a* discussed above, according to one example embodiment. For the sake of brevity, the description of features common to both toner cartridge 100*a* and toner cartridge 100*d* is not repeated, and like reference numbers are used to designate like elements.

Toner cartridge 100*d* includes a body 1104 that is substantially the same as body 104 of toner cartridge 100*a*, except that body 1104 has a larger overall size and toner capacity than body 104. Like body 104, body 1104 includes a top 1105, a bottom 1106, a front 1107, a rear 1108 and a pair of sides 1109, 1110. Toner cartridge 100*d* includes a handle 1130 for aiding the removal of toner cartridge 100*d* from image forming device 20, Handle 1130 is pivotable relative to body 1104 about pivot axis 132 between a first position shown in FIGS. 6, 7 and 8A and a second position shown in FIG. 8B. In the example embodiment illustrated, handle 1130 of toner cartridge 100*d* is substantially the same as handle 130 of toner cartridge 100*a*, except that a front segment 1134 and a rear segment 1138 are wider (in a direction from side 1109 to side 1110) than front segment 134 and rear segment 138 of handle 130 in order to accommodate the larger overall size of body 1104.

In the example embodiment illustrated, handle 1130 is operated in the same manner as handle 130. In order to move handle 1130 from the first position shown in FIG. 8A to the second position shown in FIG. 8B, a user typically contacts rear segment 1138 of handle 1130 and lifts rear segment 1138 upward. When handle 1130 moves from the first position to the second position, handle 1130 pivots clockwise as viewed in FIGS. 8A and 8B about pivot axis 132. When handle 1130 returns from the second position to the first position, for example, as a result of gravity when a user releases handle 1130, handle 1130 pivots counterclockwise as viewed in FIGS. 8A and 8B about pivot axis 132.

With reference back to FIG. 6, in the example embodiment illustrated, toner cartridge 100*d* includes a pair of notches or cutouts 11:50*a*, 1150*b* in front 1107 of body 1104 that provide clearance for corresponding pry surfaces in image forming device 20 in order to accommodate the pry surfaces during removal of toner cartridge 100*d* from image forming device 20. In the example embodiment illustrated, each cutout 1150*a*, 1150*b* is substantially the same as cutout 150 discussed above. In this embodiment, a vertical position of cutout 1150*a* is aligned with a vertical position of cutout 1150*b*. Cutout 1150*a* is positioned proximate to side 1109 of body 1104, and cutout 1150*b* is positioned proximate to side 1110 of body 1104.

Figure 7:
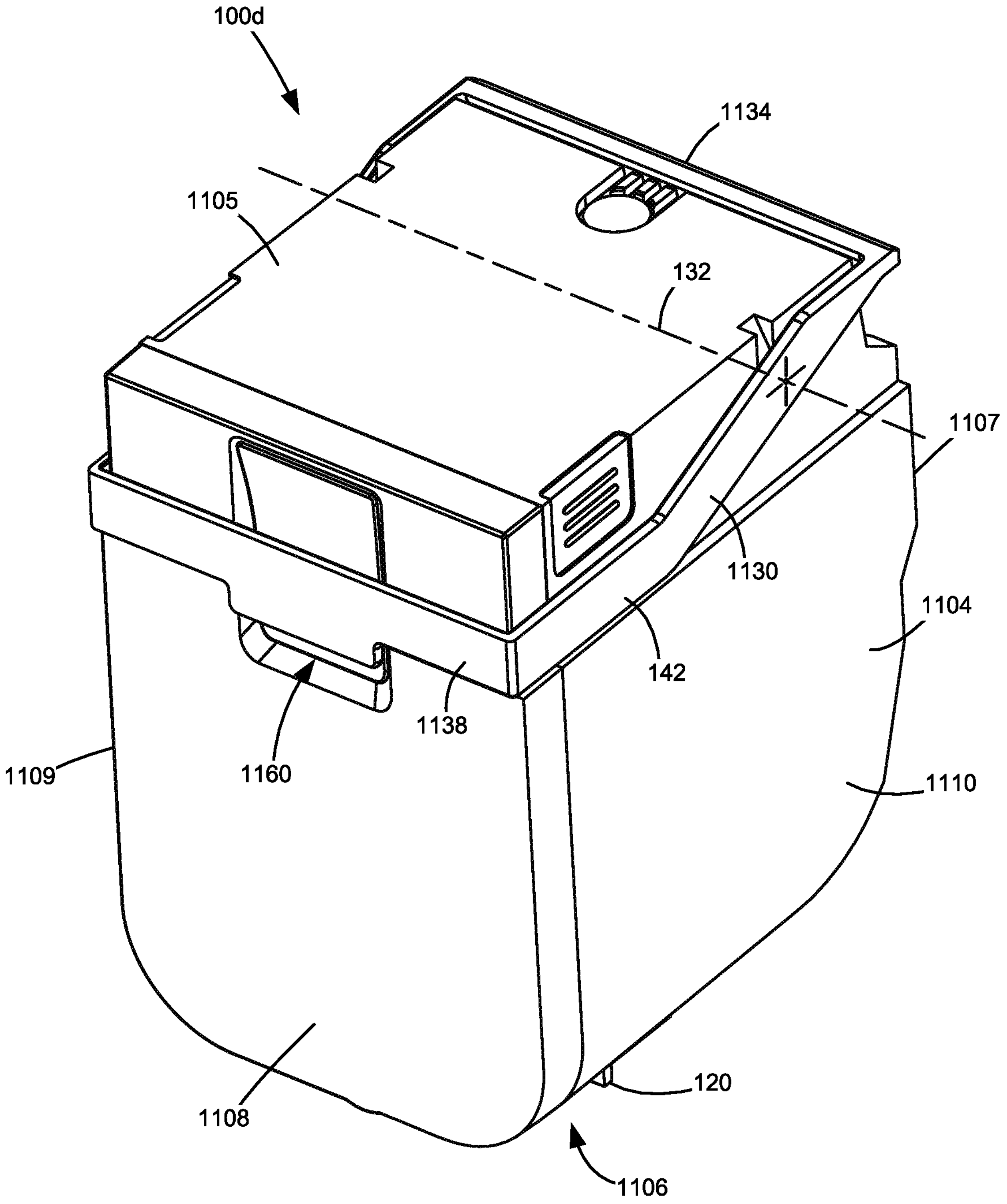
Figure 8A:
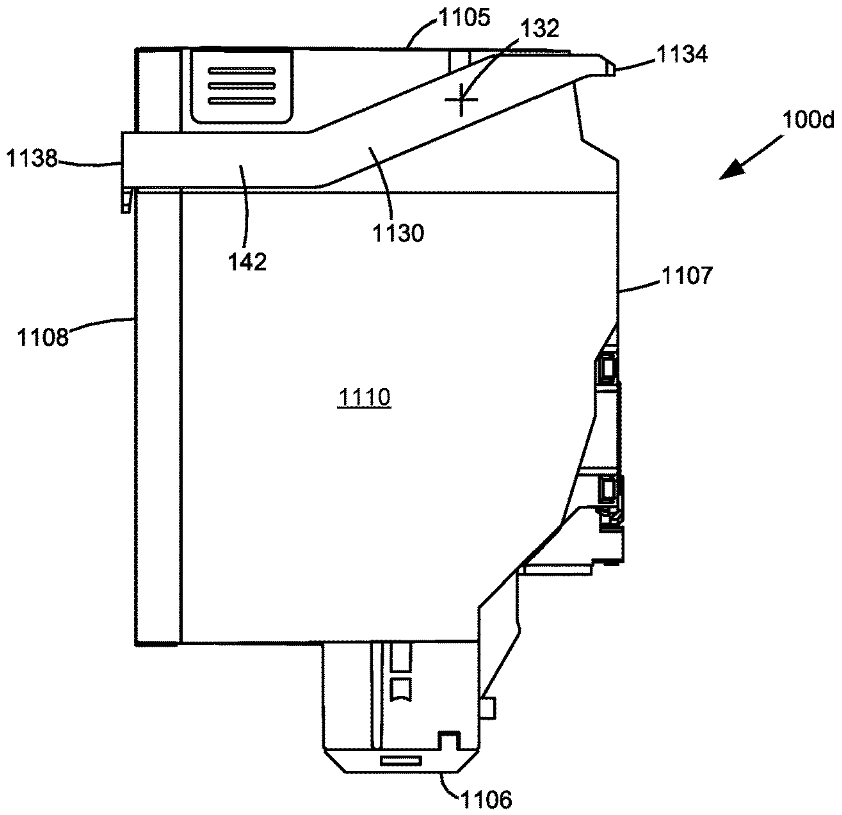
FIG. 8A is a side elevation view of the toner cartridge shown in FIGS. 6 and 7 showing a handle of the toner cartridge in a first position.
Figure 8B:
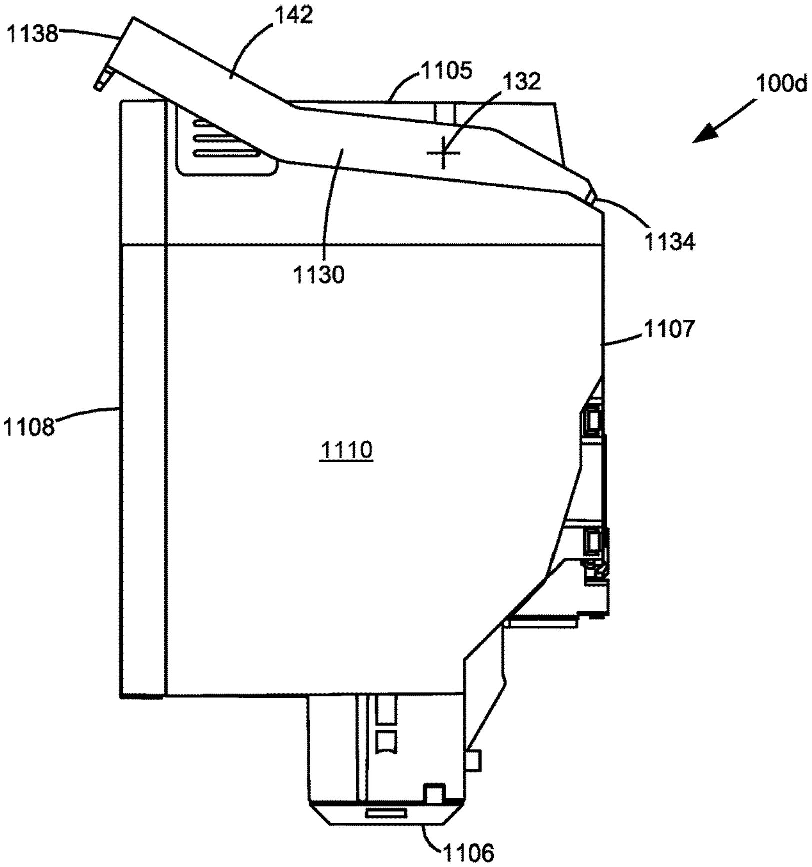
FIG. 8B is a side elevation view of the toner cartridge shown in FIGS. 6 and 7 showing the handle of the toner cartridge in a second position.

With reference to FIG. 7, in the example embodiment illustrated, toner cartridge 100*d* includes a notch or cutout 1160 in rear 1108 of body 1104 that provides clearance for a user's hand. In the example embodiment illustrated, cutout 1160 is substantially the same as cutout 160 discussed above.

Figure 9:
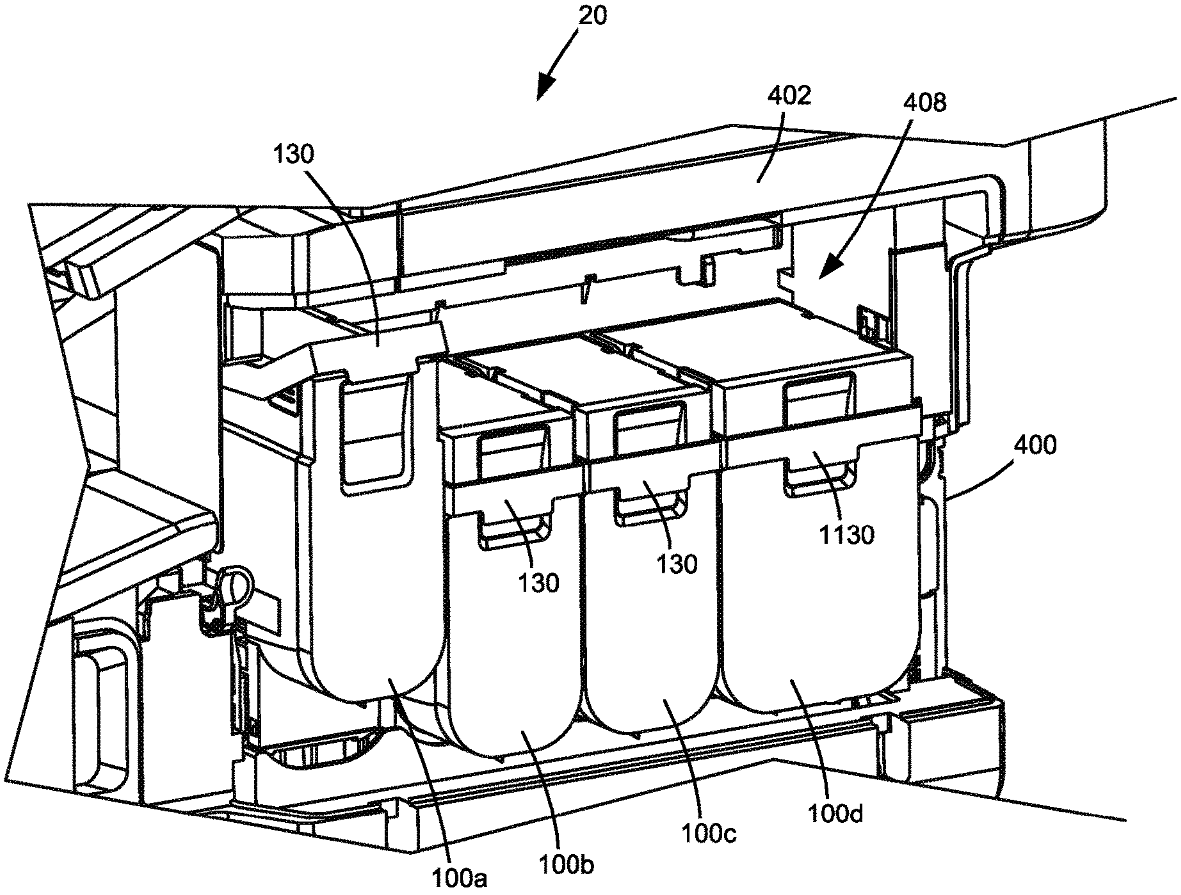
FIG. 9 is a perspective view of the image forming device with an access door of the image forming device omitted showing four toner cartridges positioned within the image forming device, with three toner cartridges in installed positions and one toner cartridge in a raised position, according to one example embodiment.
Figure 10:
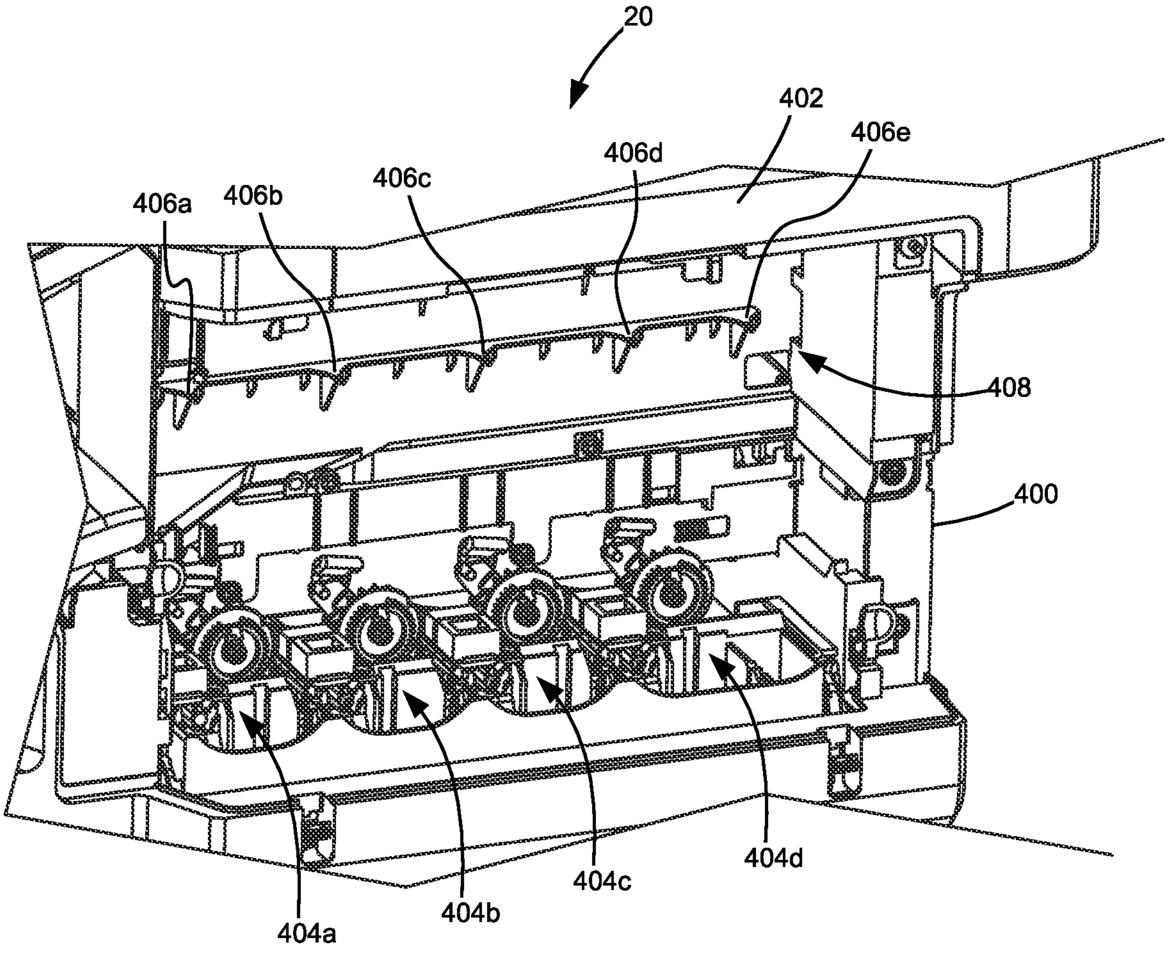
FIG. 10 is a perspective view of the image forming device shown in FIG. 9 with the access door of the image forming device omitted and the four toner cartridges removed from the image forming device according to one example embodiment.

FIGS. 9 and 10 show image forming device 20 according to one example embodiment. In this embodiment, image forming device 20 includes a multi-function device including an electrophotographic printer 400 and a document scanner 402. FIG. 9 shows image forming device 20 with an access door omitted in order to show toner cartridges 100*a*, 100*b*, 100*c*, 1.00*d* installed in corresponding toner cartridge receptacles 404*a*, 404*b*, 404*c*, 404*d* of image forming device 20. When the access door of image forming device 20 is opened, toner cartridges 100*a*, 100*b*, 100*c*, 100*d* are accessible within a recessed area 408 of image forming device 20. In FIG. 9, toner cartridges 100*b*, 100*c*, 100*d* are fully installed and seated in toner cartridge receptacles 404*b*, 404*c*, 404*d* of image forming device 20 with handles 130, 1130 of toner cartridges 100*b*, 100*c*, 100*d* in their respective first positions. In FIG. 9, handle 130 of toner cartridge 100*a* is shown moved from the first position to the second position causing bottom contact surface 136 of front segment 134 to contact a corresponding pry surface 406*a* positioned within image forming device 20 adjacent to toner cartridge receptable 404*a*, in turn causing toner cartridge 100*a* to raise vertically from toner cartridge receptacle 404*a* as discussed in greater detail below.

FIG. 10 shows image forming device 20 with the access door omitted and toner cartridges 100*a*, 100*b*, 100*c*, 100*d* removed. Toner cartridge receptacles 404*a*, 404*b*, 404*c*, 404*d* are shown positioned to receive and retain corresponding toner cartridges 100*a*, 100*b*, 100*c*, 100*d* within image forming device 20. In the example embodiment illustrated, toner cartridge receptacle 404*d* is positioned and sized to receive a relatively large toner cartridge 100*d*, such as the embodiment shown in FIGS. 6-8B, or a smaller toner cartridge 100*d*, such as the embodiment shown in FIGS. 3-5B. Pry surfaces 406*a*, 406*b*, 406*c*, 406*d*, 406*e* are shown positioned to engage bottom contact surfaces 136, 1136 of front segments 134, 1134 of handles 130, 1130 of toner cartridges 100*a*, 100*b*, 100*c*, 100*d* to permit a user to remove toner cartridges 100*a*, 100*b*, 100*c*, 100*d* from image forming device 20. In the example embodiment illustrated, toner cartridge receptacle 404*d* includes a pair of pry surfaces 406*d*, 406*e* positioned adjacent thereto. If a relatively large toner cartridge 100*d*, such as the embodiment shown in FIGS. 6-8B, is installed in toner cartridge receptacle 404*d*, both pry surfaces 406*d*, 406*e* contact bottom contact surface 1136 on front segment 1134 of handle 1130 when handle 1130 is moved from the first position to the second position in order to prevent twisting or flexing of handle 1130 during removal of toner cartridge 100*d*. If a smaller toner cartridge 100*d*, such as the embodiment shown in FIGS. 3-5B, is installed in toner cartridge receptacle 404*d*, only pry surface 406*d* contacts bottom contact surface 136 on front segment 134 of handle 130 when handle 130 is moved from the first position to the second position.

Figure 11C:
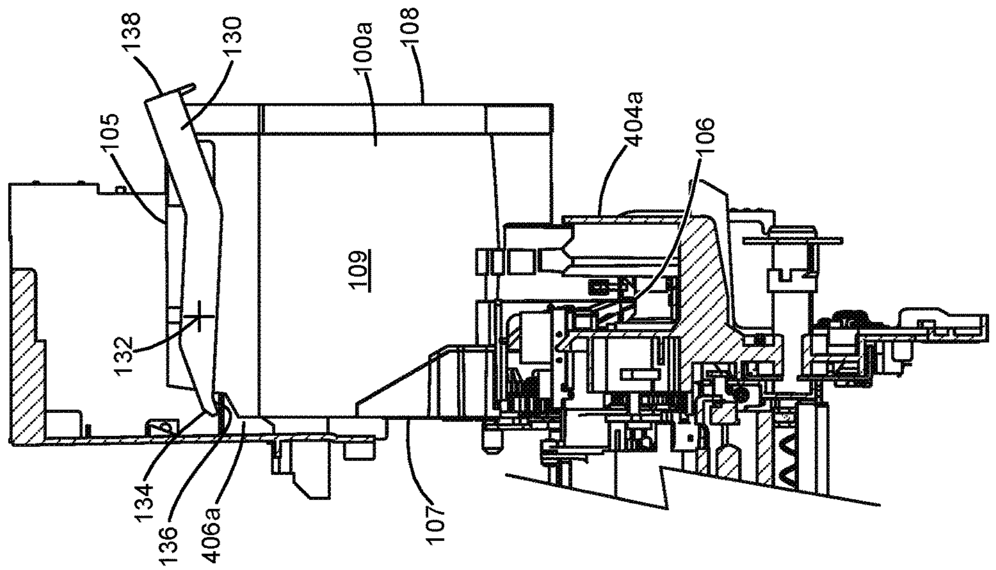
FIGS. 11A-11F are sequential side cross-sectional views showing the removal of a toner cartridge from the image forming device according to one example embodiment.
Figure 11B:
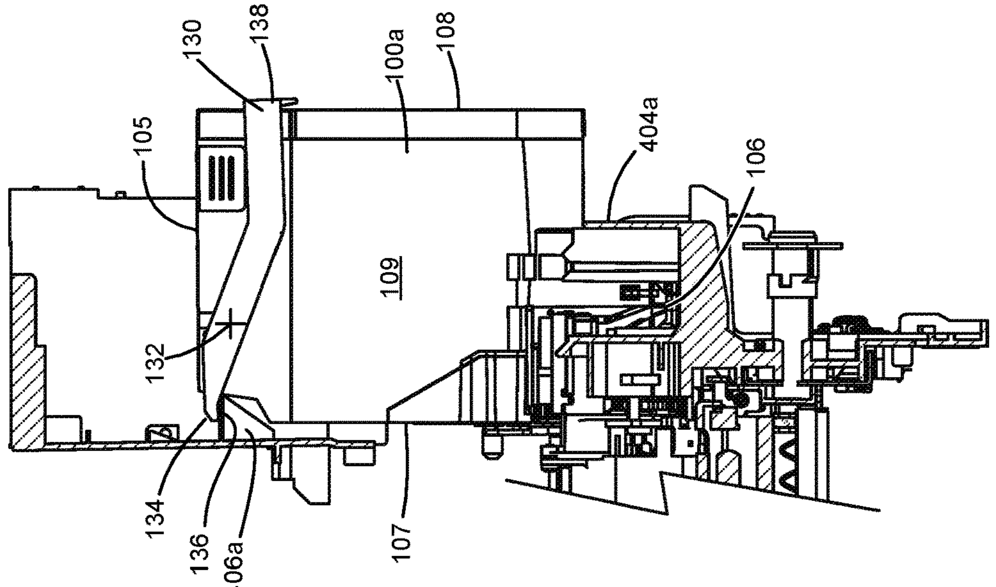
Figure 11A:
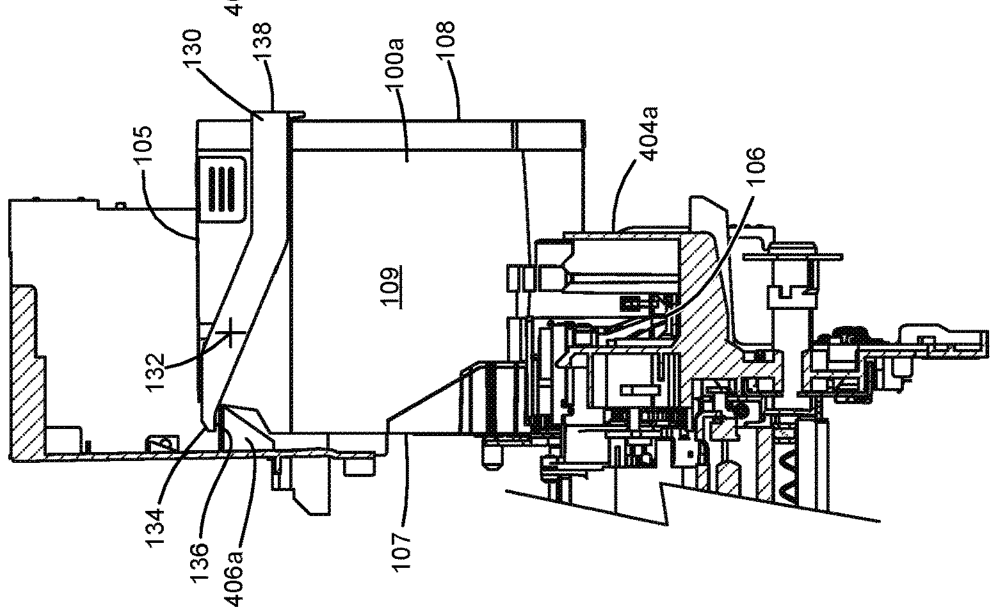

FIGS. 11A-11F are sequential views showing the removal of toner cartridge 100*a* from image forming device 20, including the operation of handle 130, according to one example embodiment. The removal of toner cartridges 100*b*, 100*c*, 100*d* from image forming device 20, including the operation of handle 1130 of toner cartridge 100*d*, is substantially the same. FIG. 11A shows toner cartridge 100*a* fully installed and seated in corresponding toner cartridge receptacle 404*a* with handle 130 in the first position. When handle 130 is in the first position with toner cartridge 100*a* fully seated in toner cartridge receptacle 404*a*, bottom contact surface 136 of front segment 134 of handle 130 is shown spaced slightly above pry surface 406*a*.

Figure 12:
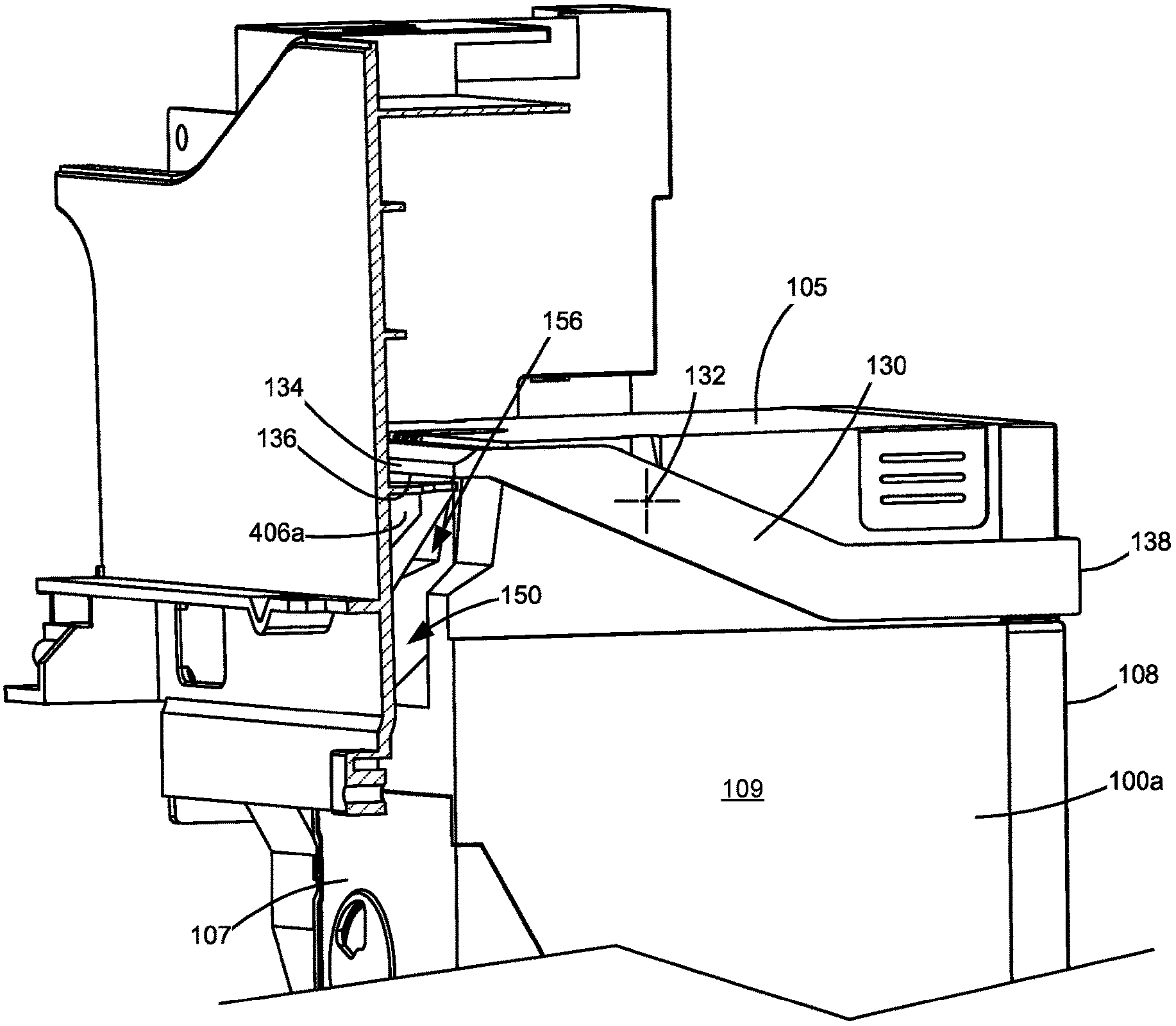
FIG. 12 is a perspective cross-sectional view showing the alignment between a pry surface of the image forming device with a cutout of the toner cartridge in the position shown in FIG. 11A according to one example embodiment.

FIG. 12 is a perspective view showing toner cartridge 100*a* in the position illustrated in FIG. 11A. As shown in FIG. 12, when handle 130 is in the first position with toner cartridge 100*a* fully seated in toner cartridge receptacle 404*a*, pry surface 406*a* in image forming device 20 is aligned along a vertical direction with cutout 150 on front 107 of body 104 of toner cartridge 100*a*, spaced above open top end 156 of cutout 150.

With reference back to FIGS. 11A-11F, as shown in FIGS. 11B and 11C, when a user manually lifts rear segment 138 of handle 130 upward, handle 130 pivots (counterclockwise as viewed in FIGS. 11A-11F) about pivot axis 132 from the first position shown in FIG. 11A. The rotation of handle 130 about pivot axis 132 resulting from the user lifting rear segment 138 causes handle 130 to act as a lever with bottom contact surface 136 of front segment 134 contacting and exerting a downward force on corresponding pry surface 406*a* in image forming device 20. The upward force applied by the user to rear segment 138 of handle 130 and the upward reaction force from pry surface 406*a* on front segment 134 of handle 130 cause toner cartridge 100*a* to raise upward from its toner cartridge receptacle 404*a* as shown in FIGS. 11B and 11C.

Figure 11D:
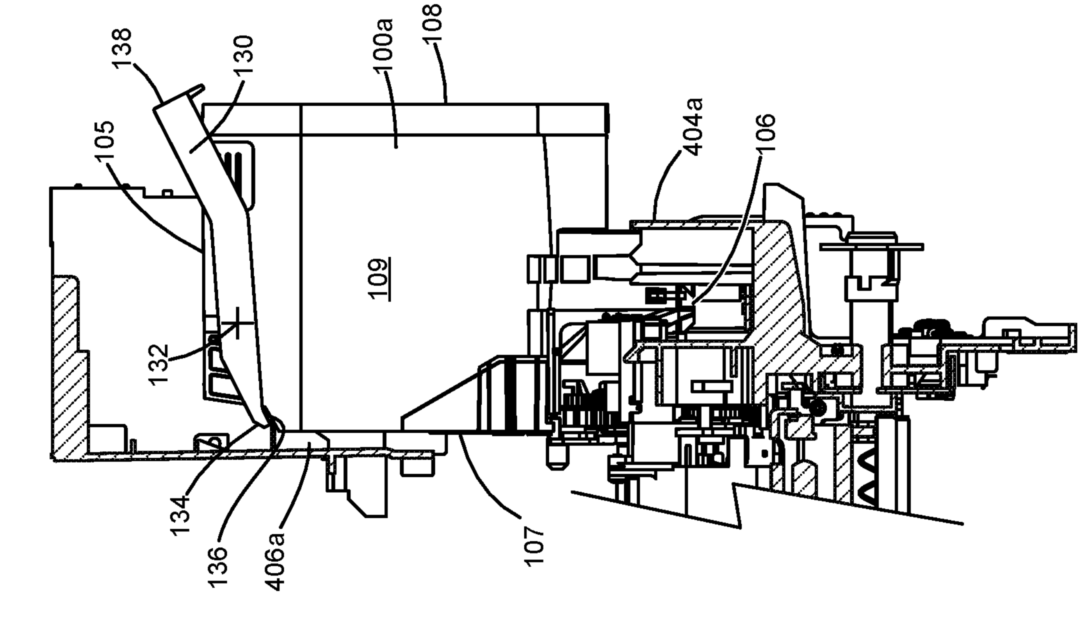
Figure 11E:
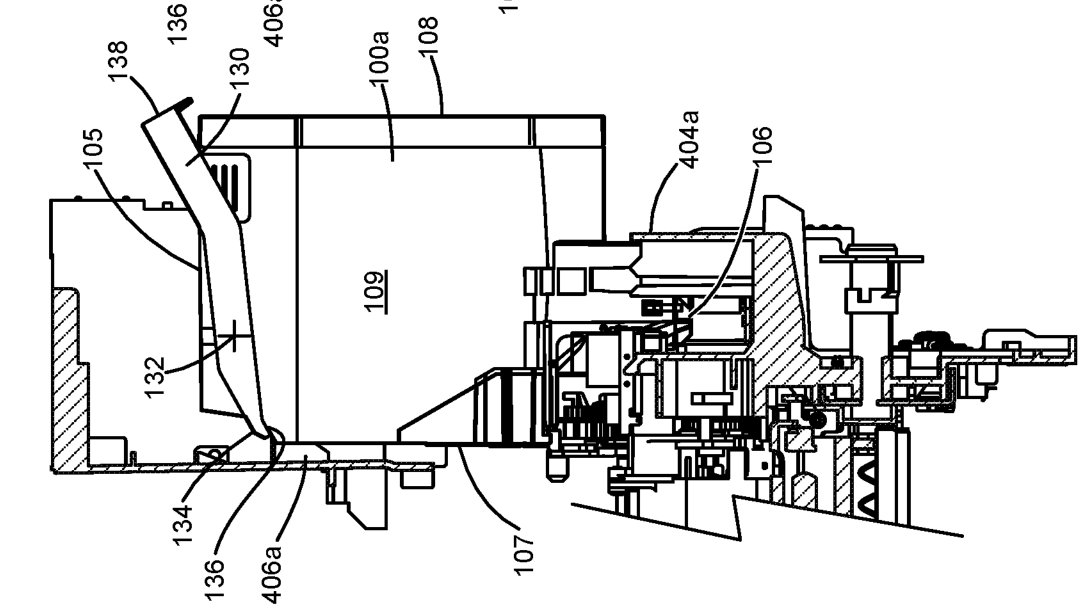

As the user continues to lift rear segment 138 of handle 130 upward, handle 130 pivots further (counterclockwise as viewed in FIGS. 11A-11F) about pivot axis 132 away from the first position of handle 130 and toward the second position of handle 130 as shown in FIGS. 111 and 11E. The contact between bottom contact surface 136 of front segment 134 of handle 130 and pry surface 406*a* causes toner cartridge 100*a* to continue to raise upward from toner cartridge receptacle 404*a* as shown in FIGS. 11D and 11E. FIG. 11E shows handle 130 in the second position with bottom contact surface 136 of front segment 134 of handle 130 in contact with pry surface 406*a*.

Figure 13:
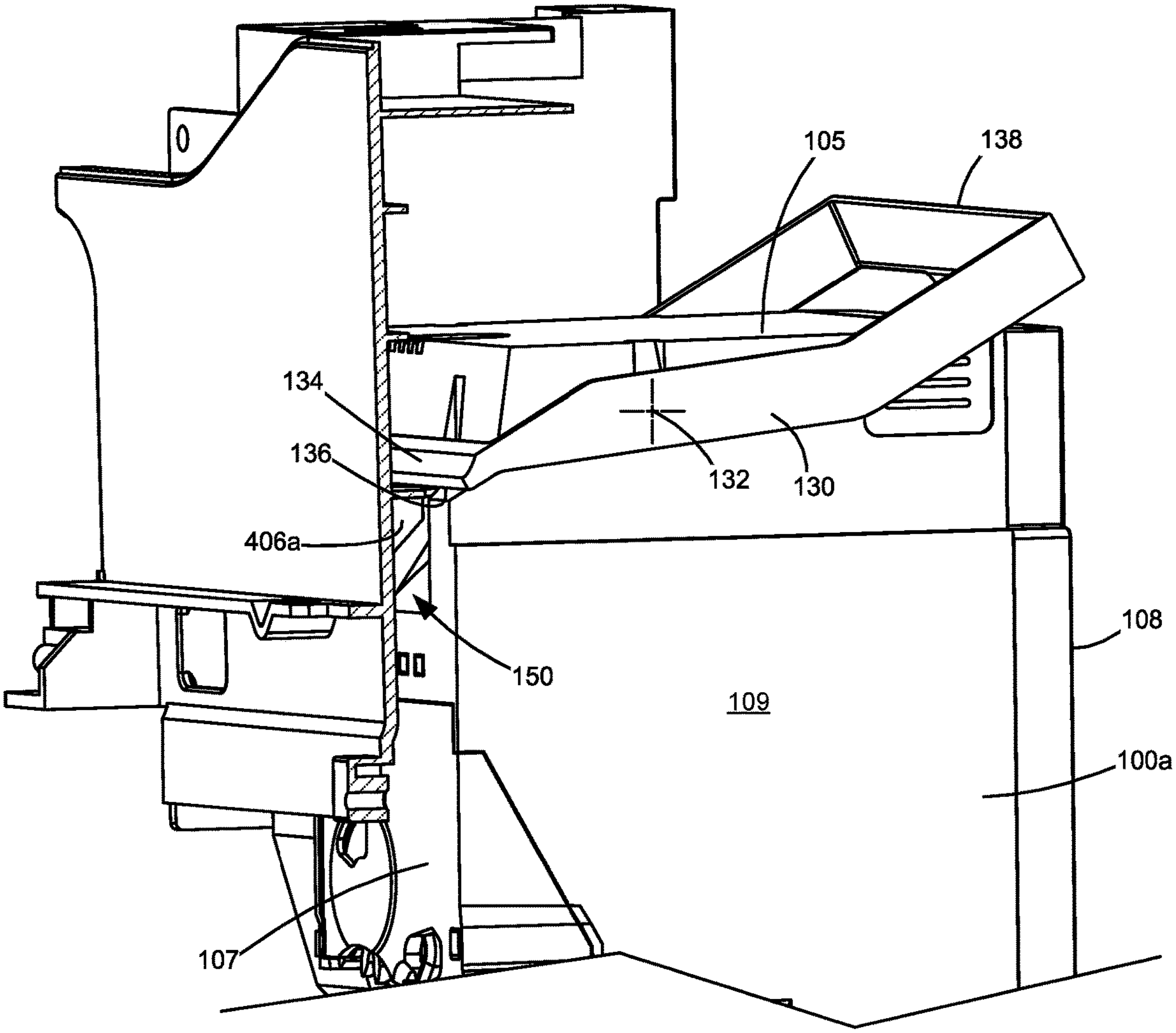
FIG. 13 is a perspective cross-sectional view showing the alignment between the pry surface of the image forming device with the cutout of the toner cartridge in the position shown in FIG. 11E according to one example embodiment.

FIG. 13 is a perspective view showing toner cartridge 100*a* in the position illustrated in FIG. 11E. As shown in FIG. 13, when handle 130 is in the second position with toner cartridge 100*a* raised upward from toner cartridge receptacle 404*a* and bottom contact surface 136 of front segment 134 of handle 130 is in contact with pry surface 406*a*, pry surface 406*a* extends into cutout 150 on front 107 of body 104 of toner cartridge 100*a*. In this manner, cutout 150 accommodates pry surface 406*a* and permits the use of a handle 130 that does not need to extend forward beyond the front 107 of body 104 of toner cartridge 100*a*.

Figure 11F:
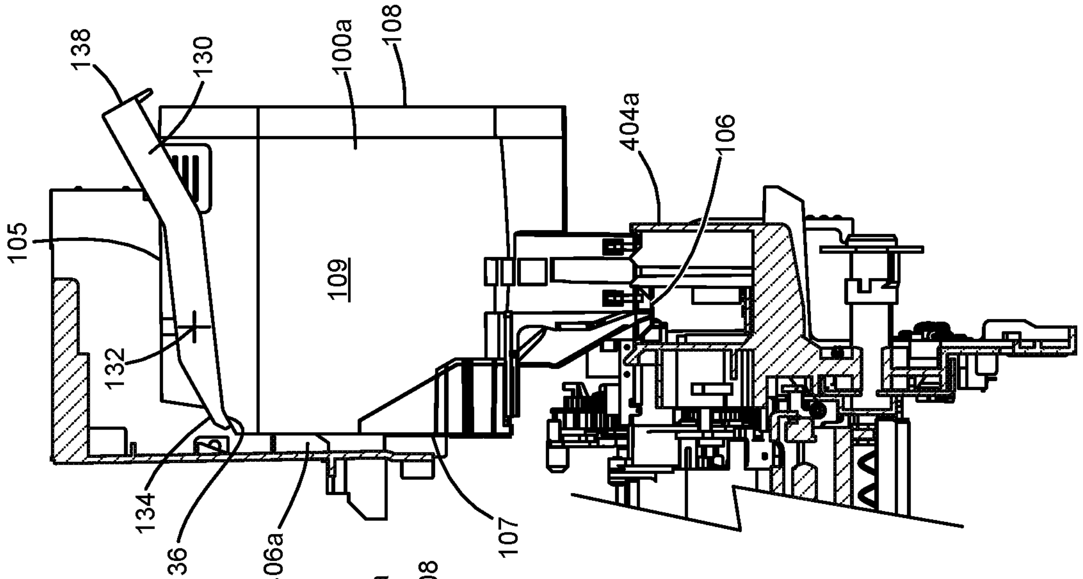

With reference back to FIGS. 11A-11F, after handle 130 reaches the second position, toner cartridge 100*a* tends to rest on a top portion of toner cartridge receptacle 404*a* permitting a user to manually lift and remove toner cartridge 100*a* with little resistance from toner cartridge receptacle 404*a*. FIG. 11F shows toner cartridge 100*a* lifted and separated from toner cartridge receptacle 404*a*.

As discussed above, in the embodiment illustrated, handle 130 of toner cartridge 100*a* tends to rest at the first position due to gravity. Accordingly, during insertion of toner cartridge 100*a* into toner cartridge receptacle 404*a* of image forming device 20, front segment 134 of handle 130 tends to be spaced above pry surface 406*a* until toner cartridge 100*a* is fully seated or nearly fully seated in toner cartridge receptacle 404*a*. If handle 130 of toner cartridge 100*a* is pivoted away from the first position and toward the second position during insertion of toner cartridge 100*a* into toner cartridge receptacle 404*a*, pry surface 406*a* will contact bottom contact surface 136 of front segment 134 of handle 130, and the downward insertion of toner cartridge 100*a* into toner cartridge receptacle 404*a* will cause handle 130 to pivot about pivot axis 132 toward the first position. When toner cartridge 100*a* is fully installed and seated in toner cartridge receptacle 404*a*, front segment 134 of handle 130 tends to rest on or just above pry surface 406*a* with handle 130 in the first position as illustrated in FIGS. 11A and 12.

Accordingly, the present disclosure provides an assembly for efficiently removing an existing toner container and installing a replacement toner container. Handles 130, 1130 of the present disclosure allow a reduced overall height of toner cartridge 100 in comparison with a handle positioned on the top of toner cartridge 100. For example, in the embodiments illustrated, handles 130, 1130, including front segments 134, 1134, rear segments 138, 1138 and side segments 140, 142, are positioned no higher than top 105 of body 104 in the first position of handle 130. As shown in FIG. 9, where image forming device 20 includes one or more components positioned above toner cartridges 100*a*, 100*b*, 100*c*, 100*d*, such as document scanner 402, handles 130, 1130 of the present disclosure allow the overall height of image forming device 20 to be reduced, consistent with user preferences for smaller devices. If, on the other hand, toner cartridges 100*a*, 100*b*, 100*c*, 100*d* included handles occupying more vertical space above toner cartridges 100*a*, 100*b*, 100*c*, 100*d*, such as handles positioned on the tops of toner cartridges 100*a*, 100*b*, 100*c*, 100*d*, a larger recessed area 408 having a greater height would be required in order to provide users with enough vertical space to remove and install toner cartridges 100*a*, 100*b*, 100*c*, 100*d*.

As illustrated in FIG. 9, handles 130, 1130 of the present disclosure also provide the user with a touch point, i.e., rear segment 138, 1138 in the example embodiments illustrated, that is positioned closer to the user than a handle positioned on the top of the toner cartridge. In this manner, handles 130, 1130 of the present disclosure provide a more visible and more intuitive mechanism for removing each toner cartridge 100.

Further, handles 130, 1130 of the present disclosure provide a relatively long lever arm for removing toner cartridge 100 that extends from rear segment 138, 1138 actuated by the user to front segment 134, 1134 that contacts the corresponding pry surface in image forming device 20. The relatively long lever arm provided by handles 130, 1130 helps reduce the force required for a user to move handle 130, 1130 from the first position to the second position to lift toner cartridge 100 out of its corresponding toner cartridge receptacle within image forming device 20.

Although the example embodiment shown in FIG. 2 includes toner cartridges 100, developer units 200 and PC units 300 positioned in separate replaceable units, it will be appreciated that the replaceable unit(s) of image forming device 20 may employ any suitable configuration as desired. For example, in one embodiment, the main toner supply for image forming device 20, developer unit 200 and PC unit 300 are combined in a separate replaceable unit for each color toner. In another embodiment, the main toner supply for image forming device 20 and developer unit 200 are provided in a first replaceable unit and PC unit 300 is provided in a second replaceable unit. Other combinations are possible without departing from the scope of the present disclosure.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a body having a top and a bottom relative to an operative orientation of the toner container when the toner container is installed in the image forming device, the body having a first side, a second side, a third side and a fourth side, the body has a reservoir for holding toner;

a downward facing outlet port positioned on the first side of the body for exiting toner from the toner container; and a handle pivotable relative to the body about a pivot axis between a first position and a second position, the handle includes a front segment extending along the first side of the body when the handle is in the first position for contacting a corresponding pry surface in the image forming device when the handle moves from the first position to the second position for lifting the toner container from a corresponding toner container receptacle in the image forming device when the toner container is installed in the image forming device, the handle includes a rear segment extending along the second side of the body when the handle is in the first position permitting a user to actuate the rear segment to move the handle from the first position to the second position for removing the toner container from the corresponding toner container receptacle in the image forming device when the toner container is installed in the image forming device, the handle includes a first side segment extending along the third side of the body and a second side segment extending along the fourth side of the body, the first and second side segments connect the front segment and the rear segment.

2. The toner container of claim 1, wherein the front segment, the rear segment and the first and second side segments of the handle are positioned no higher than the top of the body when the handle is in the first position and the toner container is in the operative orientation.

3. The toner container of claim 1, wherein the front segment extends horizontally along the first side of the body when the handle is in the first position.

4. The toner container of claim 1, wherein when the toner container is in the operative orientation, a bottom contact surface of the front segment positioned to contact the corresponding pry surface in the image forming device when the handle moves from the first position to the second position is positioned higher than the pivot axis when the handle is in the first position and lower than the pivot axis when the handle is in the second position.

5. The toner container of claim 1, wherein the rear segment extends horizontally along the second side of the body when the handle is in the first position.

6. The toner container of claim 1, wherein when the toner container is in the operative orientation, the rear segment is positioned lower than the pivot axis when the handle is in the first position and higher than the pivot axis when the handle is in the second position.

7. The toner container of claim 1, wherein the first and second side segments each include a front portion that is proximate to the first side of the body and that extends downward and toward the second side of the body when the handle is in the first position.

8. The toner container of claim 7, wherein the pivot axis extends through the front portions of the first and second side segments.

9. The toner container of claim 1, wherein the first and second side segments each include a rear portion that extends horizontally when the handle is in the first position.

10. The toner container of claim 1, further comprising a notch in the first side of the body below the front segment of the handle when the handle is in the first position providing clearance for the corresponding pry surface in the image forming device during removal of the toner container from the corresponding toner container receptacle in the image forming device.

11. The toner container of claim 10, wherein the notch in the first side of the body includes a tapered bottom surface that tapers upward in a direction from the first side of the body toward the second side of the body.

12. The toner container of claim 11, wherein the notch in the first side of the body includes first and second tapered side surfaces that taper inward toward each other in the direction from the first side of the body toward the second side of the body.

13. The toner container of claim 10, wherein the notch in the first side of the body includes a first notch positioned proximate to the third side of the body and a second notch positioned proximate to the second fourth side of the body.

14. The toner container of claim 13, wherein when the toner container is in the operative orientation, a vertical position of the first notch is aligned with a vertical position of the second notch.

15. The toner container of claim 1, further comprising a notch in the second side of the body providing clearance for a user's hand permitting a user to manually actuate the rear segment to move the handle from the first position to the second position.

16. A toner container for use in an image forming device, comprising:

a body having a top and a bottom relative to an operative orientation of the toner container when the toner container is installed in the image forming device, the body having a first side, a second side, a third side and a fourth side, the body has a reservoir for holding toner;

a downward facing outlet port positioned on the first side of the body for exiting toner from the toner container; and a handle pivotable relative to the body about a pivot axis between a first position and a second position, the handle includes a front segment extending along the first side of the body when the handle is in the first position for contacting a corresponding pry surface in the image forming device when the handle moves from the first position to the second position for lifting the toner container from a corresponding toner container receptacle in the image forming device when the toner container is installed in the image forming device, the handle includes a rear segment extending along the second side of the body when the handle is in the first position permitting a user to lift the rear segment upward to move the handle from the first position to the second position causing the front segment to move downward to exert a downward force on the corresponding pry surface for removing the toner container from the corresponding toner container receptacle in the image forming device when the toner container is installed in the image forming device, the handle is positioned no higher than the top of the housing when the handle is in the first position and the toner container is in the operative orientation.

17. The toner container of claim 16, wherein the handle includes a first side segment extending along the third side of the body and a second side segment extending along the fourth side of the body, the first and second side segments connect the front segment and the rear segment.

18. The toner container of claim 17, wherein the first and second side segments each include a front portion that is proximate to the first side of the body and that extends downward and toward the second side of the body when the handle is in the first position.

19. The toner container of claim 18, wherein the pivot axis extends through the front portions of the first and second side segments.

20. The toner container of claim 17, wherein the first and second side segments each include a rear portion that extends horizontally when the handle is in the first position.

21. The toner container of claim 16, wherein the front segment extends horizontally along the first side of the body when the handle is in the first position.

22. The toner container of claim 16, wherein when the toner container is in the operative orientation, a bottom contact surface of the front segment positioned to contact the corresponding pry surface in the image forming device when the handle moves from the first position to the second position is positioned higher than the pivot axis when the handle is in the first position and lower than the pivot axis when the handle is in the second position.

23. The toner container of claim 16, wherein the rear segment extends horizontally along the second side of the body when the handle is in the first position.

24. The toner container of claim 16, wherein when the toner container is in the operative orientation, the rear segment is positioned lower than the pivot axis when the handle is in the first position and higher than the pivot axis when the handle is in the second position.

25. The toner container of claim 16, further comprising a notch in the first side of the body below the front segment of the handle when the handle is in the first position providing clearance for the corresponding pry surface in the image forming device during removal of the toner container from the corresponding toner container receptacle in the image forming device.

26. The toner container of claim 25, wherein the notch in the first side of the body includes a tapered bottom surface that tapers upward in a direction from the first side of the body toward the second side of the body.

27. The toner container of claim 26, wherein the notch in the first side of the body includes first and second tapered side surfaces that taper inward toward each other in the direction from the first side of the body toward the second side of the body.

28. The toner container of claim 25, wherein the notch in the first side of the body includes a first notch positioned proximate to the third side of the body and a second notch positioned proximate to the fourth side of the body.

29. The toner container of claim 28, wherein when the toner container is in the operative orientation, a vertical position of the first notch is aligned with a vertical position of the second notch.

30. The toner container of claim 16, further comprising a notch in the second side of the body providing clearance for a user's hand permitting a user to manually lift the rear segment to move the handle from the first position to the second position.

* * * * *